United States Patent
Williams et al.

(10) Patent No.: US 7,151,774 B1
(45) Date of Patent: Dec. 19, 2006

(54) METHOD AND APPARATUS FOR TRUNKING LINKS HAVING DIFFERENT TRANSMISSION RATES

(75) Inventors: Robert Alan Williams, Cupertino, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 919 days.

(21) Appl. No.: 09/879,088

(22) Filed: Jun. 13, 2001

(51) Int. Cl.
*H04L 12/28* (2006.01)
*H04L 12/56* (2006.01)

(52) U.S. Cl. .................. 370/392; 370/401; 370/422; 709/229

(58) Field of Classification Search ............. 370/389, 370/391, 392, 400, 401, 468, 422, 423, 413, 370/458
See application file for complete search history.

(56) References Cited

U.S. PATENT DOCUMENTS

| | | | | |
|---|---|---|---|---|
| 4,771,425 A * | 9/1988 | Baran et al. | ........... | 370/458 |
| 5,748,629 A * | 5/1998 | Caldara et al. | ........... | 370/389 |
| 5,884,040 A * | 3/1999 | Chung | ........... | 709/227 |
| 6,021,132 A * | 2/2000 | Muller et al. | ........... | 370/412 |
| 6,151,297 A * | 11/2000 | Congdon et al. | ........... | 370/216 |
| 6,262,974 B1 * | 7/2001 | Chevalier et al. | ........... | 370/232 |
| 6,363,077 B1 * | 3/2002 | Wong et al. | ........... | 370/422 |
| 6,490,276 B1 * | 12/2002 | Salett et al. | ........... | 370/360 |
| 6,738,384 B1 * | 5/2004 | Chung | ........... | 370/412 |
| 6,788,671 B1 * | 9/2004 | Ryals et al. | ........... | 370/351 |
| 6,788,682 B1 * | 9/2004 | Kimmitt | ........... | 370/389 |
| 2002/0034189 A1 * | 3/2002 | Haddock et al. | ........... | 370/423 |

OTHER PUBLICATIONS

Harry Newton, Newton's Telecom Dictionary, Jan. 1998, Flatiron publishing, 13th Edition.*

* cited by examiner

*Primary Examiner*—Doris H. To
*Assistant Examiner*—Ian N. Moore
(74) *Attorney, Agent, or Firm*—Harrity Snyder LLP (57) ABSTRACT

A network device that controls the communication of data frames between stations includes ports that receive data frames from the stations and transmit the data frames. A number of the ports may be configured as a trunk and at least one of the ports in the trunk may be configured to transmit data frames at a higher speed than the other ports. The network device further includes data frame processing logic that identifies ports on which to transmit the received data frames. The data frame processing logic also determines whether the identified port is part of the trunk. When the port is part of the trunk, the data frame processing logic determines an appropriate port on which to transmit the data frame. The data frame processing logic may determine the appropriate port based on the priority associated with the received data frame so that higher priority data frames are transmitted on higher speed ports.

18 Claims, 6 Drawing Sheets

| STATIC BIT | HIT BIT | VLAN INDEX | PORT VECTOR | MAC ADDRESS | NEXT POINTER |

| PRIORITY CLASS | PORT VECTOR | UNTAGGED SET | RX PORT | VLAN ID | OPCODE | FRAME POINTER |

METHOD AND APPARATUS FOR TRUNKING LINKS HAVING DIFFERENT TRANSMISSION RATES

TECHNICAL FIELD

The present invention relates generally to network communications and, more particularly, to trunking links having different rates of transmission.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

Trunking, also referred to as link aggregation, is a technique that treats two or more point-to-point connections between the same two network devices as a single network link. Trunking is used to obtain a higher bandwidth path between two network devices, such as two switches or a server and a switch. Trunking also increases reliability by maintaining redundant connections between the network devices.

The IEEE 802.3ad standard regarding trunking requires that each link in a single trunk transmit data frames at the same speed. One drawback with such an approach is that the network device may include a number of links that transmit data frames at different rates. This limits the flexibility associated with establishing trunks.

In addition, conventional network switches use trunking distribution schemes to distribute traffic over the links. Since all the links in the trunk transmit data at the same speed, there is no advantage associated with transmitting data frames over any one of the links in the trunk. Therefore, conventional switches randomly distribute traffic over the individual links in a trunk.

DISCLOSURE OF THE INVENTION

There exists a need for a network device in which mixed speed links may be configured to form a trunk between two devices. This and other needs are met by the present invention, where a network device allows ports that transmit data frames at different transmission rates to be linked in a single trunk. The network device may then distribute higher priority traffic on a faster link and lower priority traffic on one of the other links in the trunk.

According to one aspect of the present invention, a network device that controls communication of data frames between stations is provided. The network device includes a plurality of ports configured to receive data frames from the stations and to transmit the data frames. A number of the ports on the network device may be configured as a trunk and at least one of the ports in the trunk may be configured to transmit data frames at a higher speed than other ports in the trunk. The network device also includes data frame processing logic configured to identify data forwarding information for a received data frame, the data forwarding information identifying at least a first one of the ports. The data frame processing logic is also configured to determine whether the first port is part of the trunk and determine a priority associated with the received data frame. The data frame processing logic is further configured to determine, when the first port is part of the trunk, a port in the trunk on which to transmit the data frame based on the priority associated with the received data frame.

Another aspect of the present invention provides a method in a network device that controls the communication of data frames between stations. The method includes configuring a plurality of ports on the network device as a trunk, at least one of the ports in the trunk being configured to transmit data frames at a higher speed than other ports in the trunk. The method also includes receiving a data frame on one of a plurality of ports of the network device and identifying data forwarding information for the received data frame, the data forwarding information identifying at least a first one of the ports on which to transmit the data frame. The method further includes determining whether the first port is part of the trunk, determining a priority associated with the received data frame and determining, when the first port is part of the trunk, a port in the trunk on which to transmit the data frame based on the priority associated with the received data frame.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
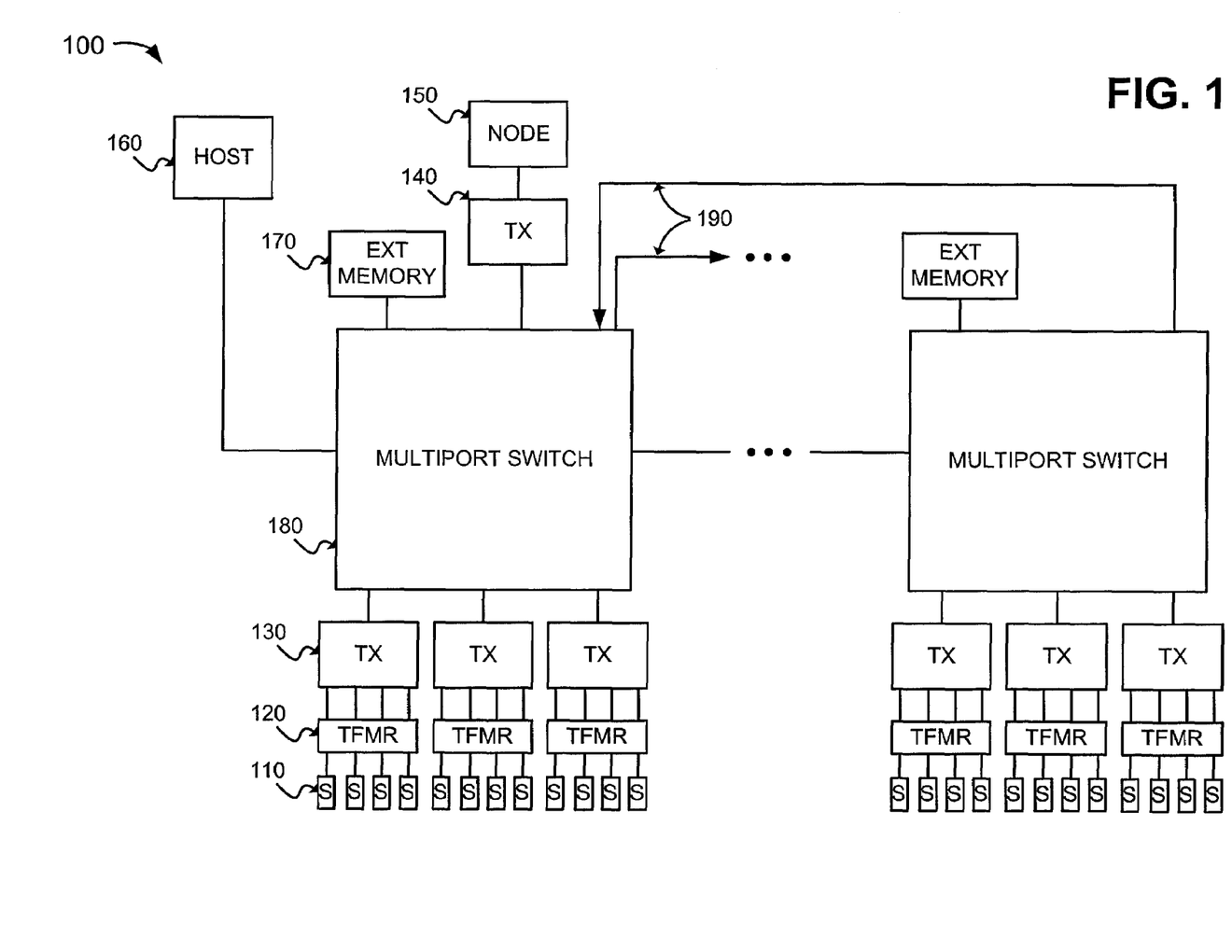
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
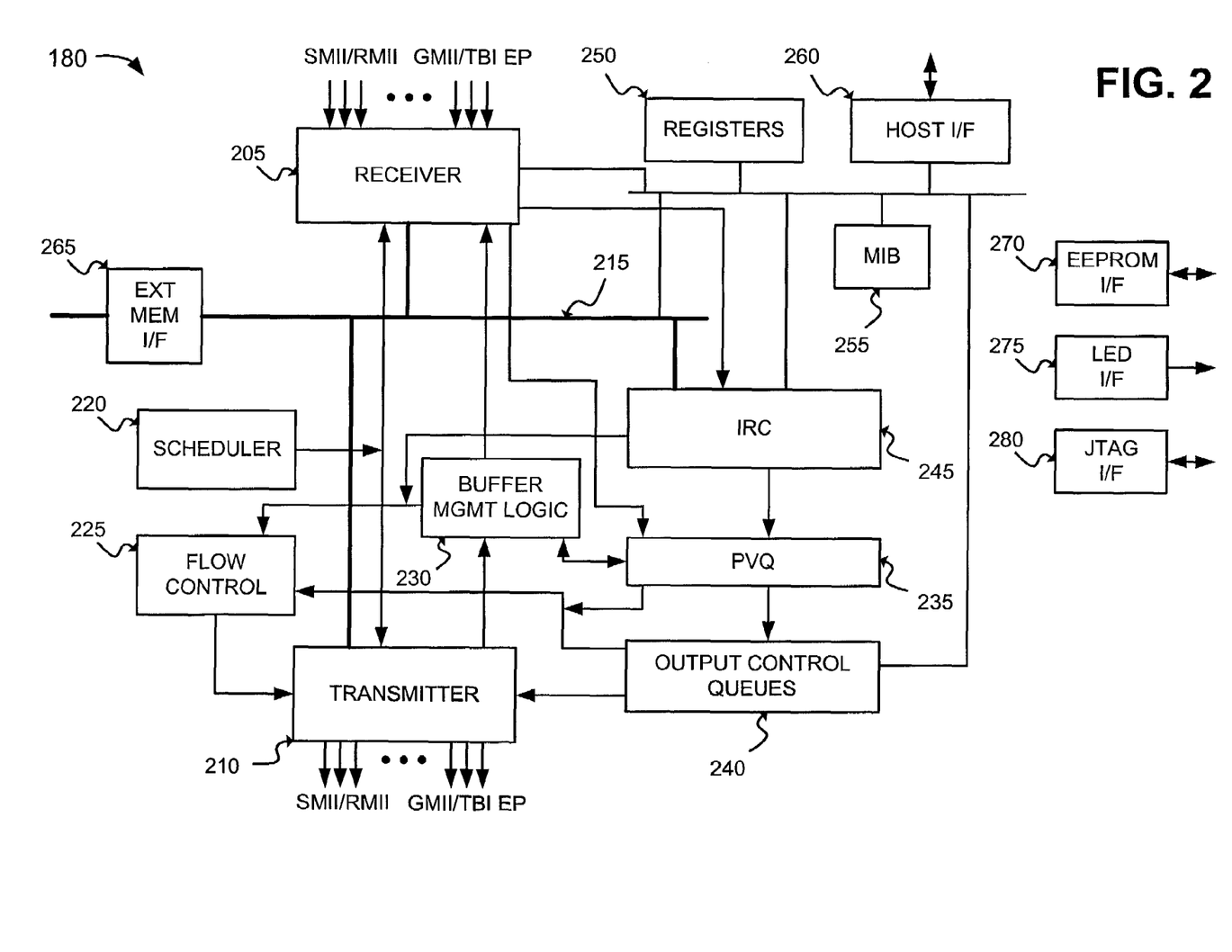
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Trunking Mixed Speed Links

The present invention is directed to trunking links in a network device, such as multiport switch 180, where the individual links in the trunk may transmit data at different speeds. The multiport switch 180, consistent with the present invention, may then provide a faster link for high priority traffic and other links for lower priority traffic.

Figure 3:
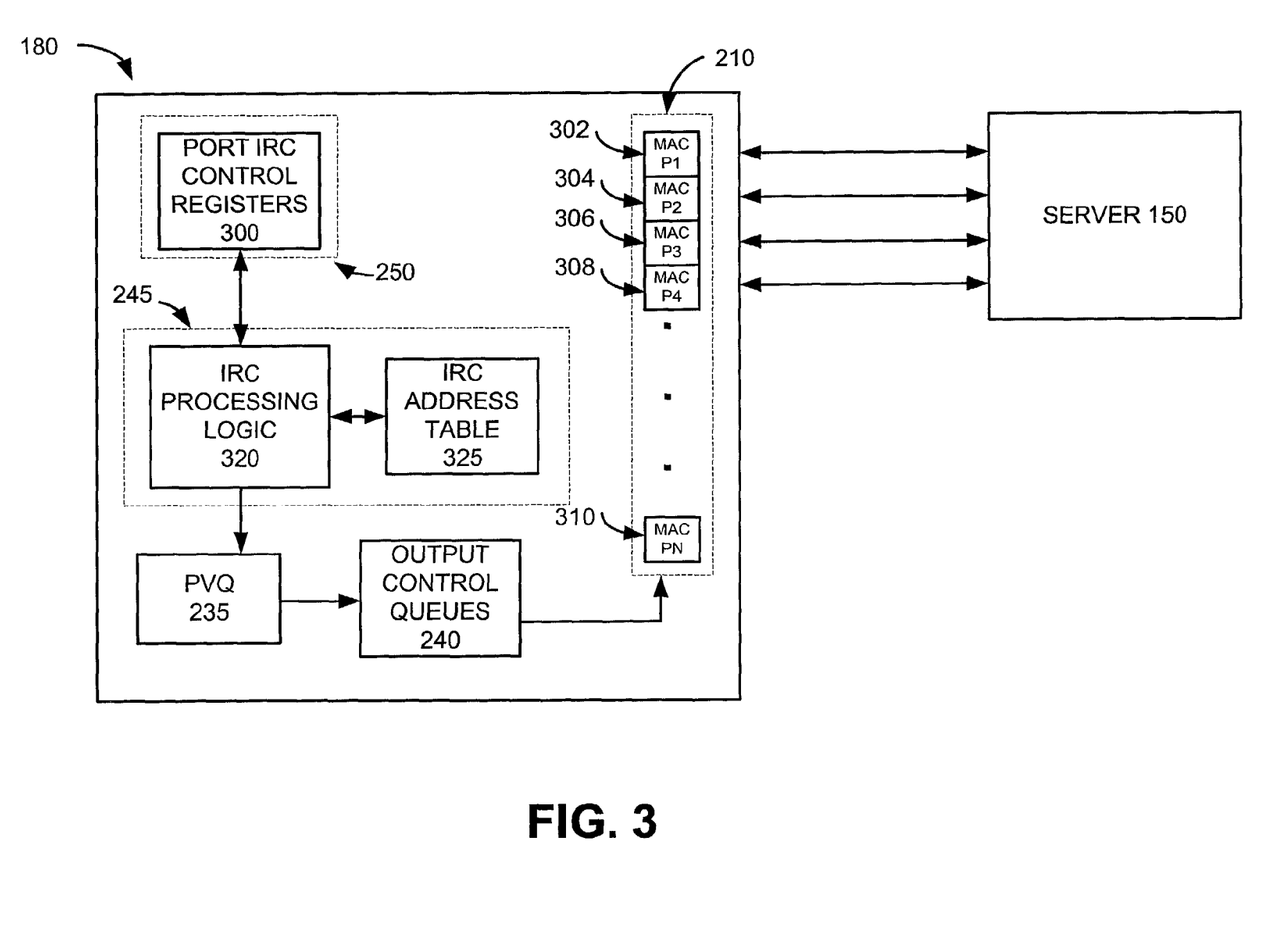
FIG. 3 is an exemplary detailed block diagram of a portion of the multiport switch of FIG. 2, consistent with an implementation of the present invention.

FIG. 3 illustrates a portion of multiport switch 180 consistent with an exemplary implementation of the present invention. Referring to FIG. 3, multiport switch 180 includes transmitter 210, IRC 245, registers 250, port vector queue (PVQ) 235 and output control queues 240. FIG. 3 also includes network node 150 (FIG. 1), referred to and labeled as server 150.

Transmitter 210 may include a number of MAC transmit modules 302–310, labeled MAC P1 through MAC PN, corresponding to output ports 1 through N. It should be understood that multiport switch 180 also includes a number of MAC receive modules associated with ports P1-PN (not shown). Alternatively, the functions of the MAC transmit modules and MAC receive modules may be performed by transceiver modules. The server 150 may include any conventional server or gateway that communicates with multiport switch 180.

Figure 4:
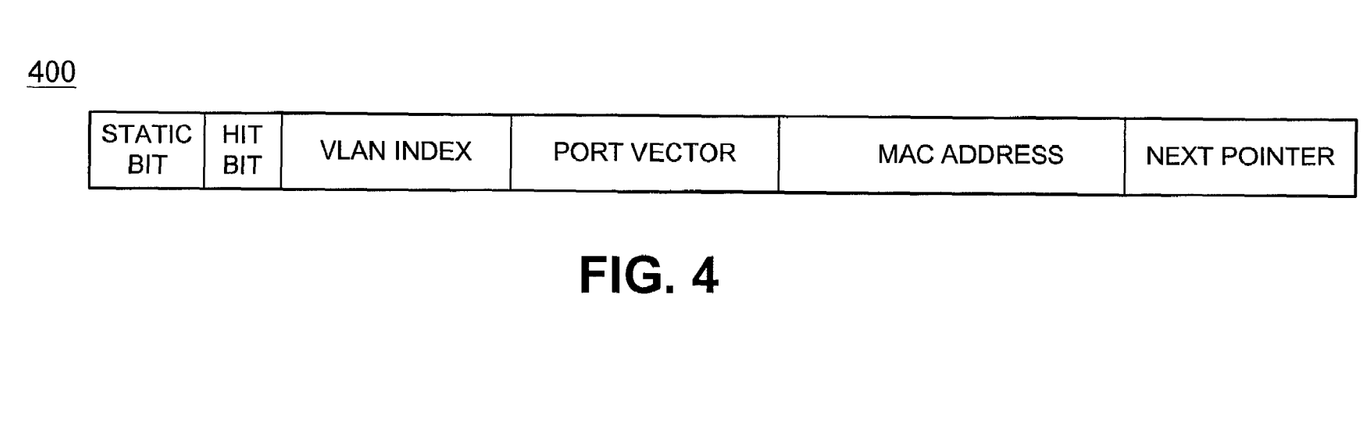
FIG. 4 is a diagram illustrating an entry in the address table of FIG. 3, according to an exemplary implementation consistent with the present invention.

The IRC 245 included IRC processing logic 320 and IRC address table 325. The IRC processing logic 320 searches the IRC address table 325 for data forwarding information for the received data frames. FIG. 4 illustrates an exemplary format of an entry in IRC address table 325.

Referring to FIG. 4, the address table entry 400 includes a static bit, a hit bit, a virtual local area network (VLAN) index field, a port vector field, a MAC address field and a next pointer field. The static and hit bits are used by an aging state machine (not shown) during an aging process. The VLAN index field may be used to reference a VLAN identifier (ID). A VLAN index-to-ID table (not shown) may contain the mapping associations between the VLAN index and the VLAN ID. The port vector field identifies the port(s) to which a frame should be forwarded. The MAC address field is used for matching the address information included with the received data frames to an entry in the IRC address table 325. The next pointer field identifies another entry in the IRC address table 325 associated with searching the IRC address table 325. The fields illustrated in FIG. 4 are exemplary only. It should be understood that additional fields or other fields may be included in an IRC address table entry 400 in other implementations consistent with the present invention.

Figure 5:
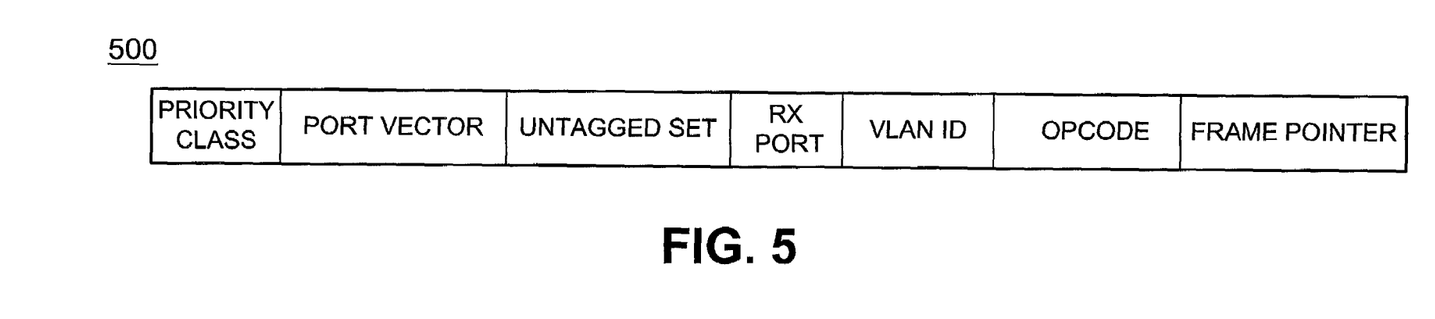
FIG. 5 is a diagram illustrating an exemplary forwarding descriptor, according to an exemplary implementation of the present invention.

Returning to FIG. 3, the IRC processing logic 320 searches the IRC address table 325 to find an entry whose address and VLAN index match the destination address and VLAN index associated with the data frame. The IRC processing logic 320 may then generate a forwarding descriptor for the data frame. FIG. 5 illustrates an exemplary forwarding descriptor consistent with an implementation of the present invention.

Referring to FIG. 5, forwarding descriptor 500 includes a priority class field, a port vector field, an untagged set field, a receive (RX) port field, a VLAN ID field, an opcode field and a frame pointer field. The priority class field indicates the output priority queue in which the frame pointer should be placed (e.g., high priority or low priority). The port vector field identifies each port(s) that should receive the data frame for transmission to its destination address. The untagged set field indicates which ports should remove VLAN tag headers before transmitting frames. The RX port field indicates the port on which the frame was received. The VLAN ID field is a 12-bit field that includes the VLAN identifier associated with the data frame. The opcode field contains information indicating how the data frame should be modified, if necessary, before transmission. The frame pointer field identifies the location in external memory 170 where the data frame is stored.

Returning to FIG. 3, registers 250 may include port IRC control registers 300. The port IRC control registers 300 may store information regarding the trunking scheme on multiport switch 180. In an exemplary implementation, the port IRC control registers 300 include one port IRC control register for each of the ports on multiport switch 180. It should be understood that in alternative implementations, the port IRC control registers 300 may include a single register or table. In any event, the port IRC control registers 300 may include information indicating whether each port on the multiport switch 180 is a member of a trunk and whether the port is an active member of the trunk. To assign ports to a trunk, the multiport switch 180 may set one or more control bits in the port IRC control registers 300.

For example, the host CPU 160 may set a TRUNK bit and a TRUNK_ACT bit in one of the port IRC control registers 300. The TRUNK bit may indicate whether the corresponding port is a member of a trunk. The TRUNK_ACT bit may indicate whether the corresponding port is an active member of the trunk. If the TRUNK_ACT bit is set to "1," for example, the IRC 245 may consider this port as a possible output port. If this bit is set to "0," on the other hand, and the TRUNK bit is set, the IRC 245 will not forward frames to this port. In such a situation, the IRC 245 may choose another port that is active (i.e., a port whose TRUNK bit and TRUNK_ACT bit are set to "1").

Table 1 summarizes the functions of the trunk control bits. As illustrated, if the TRUNK bit is set to a "0," the corresponding port is not part of a trunk. As such, the multiport switch 180 may not forward frames directed to this port to another port. If the TRUNK bit is set to a "1" and the TRUNK_ACT bit is set to a "0," the corresponding port is part of a trunk, but is currently inactive. This may be due, for example, to a link failure. In such a situation, the multiport switch 180 may redirect frames destined for this port to another port in the trunk. If the TRUNK bit is set to "1" and the TRUNK_ACT bit is set to "1," the corresponding port is an active part of the trunk. As a result, the multiport switch 180 may transmit frames from this port.

TABLE 1

| TRUNK bit | TRUNK_ACT bit | Description |
|---|---|---|
| 0 | X | Port is not a part of a trunk. |
| 1 | 0 | Port is part of a trunk, but is inactive. |
| 1 | 1 | Port is an active part of a trunk. |

Returning to the configuration illustrated in FIG. 3, the multiport switch 180 may, for example, configure MAC output ports 1–4 to be a single trunk. In this case, frames destined for one of these ports may be transmitted by another one of the ports, as described in more detail below. Other ports may be configured similarly to be members of a single trunk to increase bandwidth between two devices. It should also be understood that the multiport switch 180 may either reassign the ports to new trunks or disable trunking at any time.

The IRC processing logic 320 may access the information in the port IRC control registers 300 when generating the forwarding descriptor 500, as described in more detail below. The IRC processing logic 320 transfers the forwarding descriptor 500 to PVQ 235.

The PVQ 235 receives the forwarding descriptor 500 and may modify the opcode field of the forwarding descriptor 500, if necessary, based on the untagged set information included in the untagged set field. The PVQ 235 may then transfer the forwarding descriptor to appropriate queue(s) in the output control queues 240. The output control queues 240 temporarily buffer the forwarding descriptor and data frame for transmission via the appropriate MAC transmit module in transmitter 210.

Figure 6:
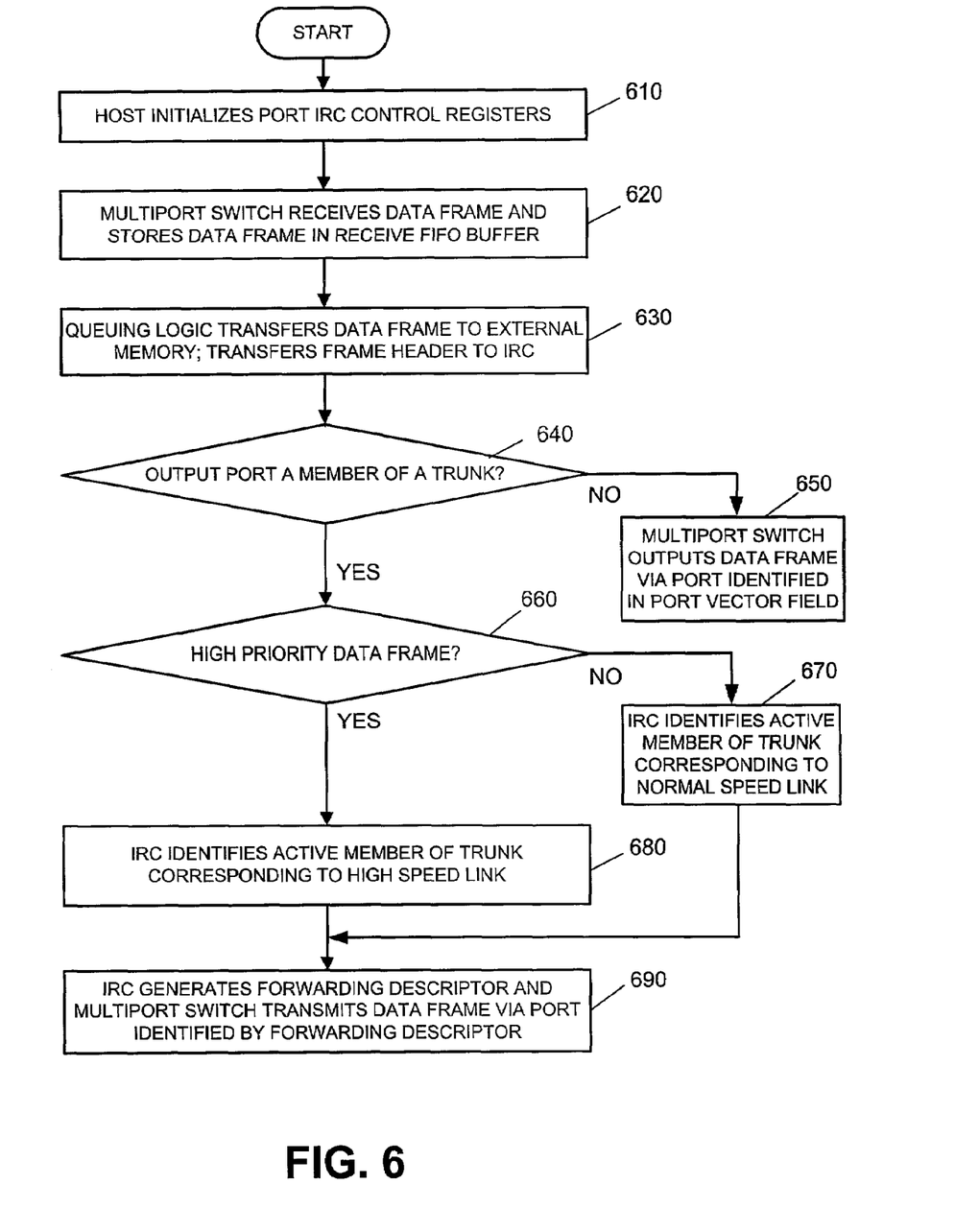
FIG. 6 is a flow diagram illustrating exemplary processing by the multiport switch of FIG. 3, consistent with an implementation of the present invention.

FIG. 6 illustrates exemplary processing by multiport switch 180 in an implementation consistent with the present invention. Processing may begin upon start-up of multiport switch 180 and host CPU 160. Upon start-up, the host CPU 160 initializes various registers and tables on multiport switch 180, such as the port IRC control registers 300 [step 610]. The host CPU 160 may initialize the port IRC control registers 300 via host interface 260.

Assume that the host CPU 160 has configured ports 1–4 to be members of a single trunk and that each of these ports is an active member of the trunk (i.e., TRUNK bit and TRUNK_ACT bit are set for each of ports 1–4). Further assume that port 1 corresponds to a 1 Gb/s port and ports 2, 3 and 4 correspond to 100 Mb/s output ports. As stated previously, the IEEE 802.3ad standard requires that only ports transmitting at the same speed can be included in the same trunk. The present invention departs from conventional techniques by allowing ports that transmit at different speeds to be members of a single trunk.

After the various registers and tables are initialized, assume that a network station 110 transmits a data frame and multiport switch 180 receives the data frame [step 620]. The multiport switch stores the received data frame in a receive FIFO buffer in receiver 205 [step 620]. Queuing logic located in receiver 205 may obtain a frame pointer from a buffer located in buffer management logic 230. The queuing logic may then transfer the data frame to external memory 170, via external memory interface 265, at the location identified by the frame pointer [step 630]. The queuing logic may also transfer the frame header to IRC 245 [step 630].

The IRC processing logic 320 may then perform a hash search of IRC address table 325 to identify an entry whose address and VLAN index match the source address and VLAN index associated with the data frame. The IRC processing logic 320 may then perform a second hash search of IRC address table 325 to find an entry whose address and VLAN index match the destination address and VLAN index associated with the data frame. The port vector field (FIG. 4) in the matching entry identifies the port(s) to which the frame may be forwarded.

The IRC processing logic 320 may then determine whether the forwarding information indicates that the data frame is to be transmitted from an output port that is part of a trunk [step 640]. In an exemplary implementation, IRC processing logic 320 may access IRC port control registers 300 to make this determination. If the output port is not a member of a trunk, the IRC processing logic 320 generates a forwarding descriptor 500 and the processing of the data frame continues in a normal manner [step 650]. That is, the multiport switch 180 forwards the data frame to the port(s) identified in the port vector field of the IRC address table entry 400.

If, however, the IRC processing logic 320 determines that the output port is part of a trunk, the IRC processing logic 320 may then determine whether the data frame is a high priority data frame [step 660]. In an exemplary implementation of the present invention, the multiport switch 180 categorizes data frames as having either a high priority or a low priority. A high priority frame may include a frame that requires lower access latency, such as a frame for a multimedia application. A low priority frame may include any other frame. In alternative implementations, the number of priorities associated with the data frames may be greater than two. For example, the multiport switch 180 may identify frames having one of three levels of priority, such as low, medium and high. The output control queues 240, consistent with the present invention, include for each port on the multiport switch 180 queues associated with each of the priority levels.

In addition, in some implementations of the present invention, the multiport switch 180 may receive data frames having a priority indication. For example, an Ethernet frame may include a three-bit field representing one of eight levels of priority. In this case, priority mapping logic on multiport switch 180 may map the received priority information to a corresponding priority level supported by the multiport switch 180. For example, the eight levels of priority may be mapped to either high or low priority on the multiport switch 180. Alternatively, the eight levels of priority associated with received data frames may be mapped to three or more levels of priority on the multiport switch 180.

In any event, if the IRC processing logic 320 determines that the data frame is not a high priority data frame (i.e., the data frame is a low or normal priority frame), the IRC processing logic 320 determines which of the normal speed links in the trunk on which to transmit the data frame [step 670]. In the example above, port 1 is a high speed link (e.g., 1 Gb/s) and ports 2–4 are normal speed links (e.g., 100 Mb/s). In this case, the IRC processing logic 320 determines that the data frame may be transmitted on any one of ports 2, 3 or 4.

In an exemplary implementation consistent with the present invention, the IRC processing logic 320 may perform a trunk mapping function to determine which of these normal speed ports on which the data frame will be transmitted. For example, the IRC processing logic 320 may perform a logic function, such as XORing the two least significant bits of the source and destination address of the data frame to generate a two-bit number. This number may then be used to select one of the three potential ports (i.e., ports 2–4) from which to transmit the data frame. In the event that the XORing results in port 1 being identified as the output port, the IRC processing logic 320 may choose the next port that is an active member of the trunk (i.e., port 2). In addition, if the IRC processing logic 320 selects an inactive port in the trunk, the IRC processing logic 320 may select an alternate port.

In this manner, the IRC processing logic 320 may distribute the data transmissions so that each normal/low speed port transmits approximately the same amount of data, while ensuring that normal/low priority traffic is not transmitted via a high speed port. The IRC processing logic 320 may then modify the port vector field information included in the IRC address entry 400 identified as the matching entry, based on output port chosen via the trunk mapping function, to generate a forwarding descriptor [step 690]. The multiport switch 180 may then transmit the data frame via the output port identified in the forwarding descriptor [step 690].

If, however, the data frame is a high priority frame, the IRC processing logic 320 determines whether one of the links in the trunk is a higher speed link [step 680]. In the example described above, port 1 is associated with a 1 Gb/s port. In this situation, the IRC processing logic 320 determines that port 1 is to transmit the high priority frame. The IRC processing logic 320 may then modify the port vector information included in the IRC address entry 400 identified as the matching entry to indicate that port 1 is the chosen output port. In the event that more than one of the ports in the trunk is a high speed port, the IRC processing logic 320 may decide which of the two ports on which to transmit the high priority data frame using the trunk mapping function in a similar manner as described above for the low priority data frames.

In either case, the IRC processing logic 320 generates a forwarding descriptor 500 indicating the appropriate output port(s) that are to transmit the data frame [step 690]. The multiport switch 180 may then transmit the data frame via the port identified in the forwarding descriptor [step 690]. That is, the IRC processing logic 320 may transfer the forwarding descriptor to PVQ 235. PVQ 235 may then transfer the forwarding descriptor and frame pointer information to the appropriate queue(s) in output control queues 240. The appropriate MAC transmit module in transmitter 210 may then transmit the data frame to its intended destination. In the example above, MAC module 302 may transmit the high priority data frames to server 150 and MAC modules 304, 306 and 308 may transmit the normal and low priority data frames to server 150.

Described has been an apparatus and method for trunking links in a network device, such as multiport switch 180. One advantage of the present invention is that ports having different speeds may be linked in a trunk. This increases the flexibility in configuring trunks. Another advantage of the present invention is that multiport switch 180 may distribute higher priority traffic on a faster link and lower priority traffic on a normal speed link. This results in improved efficiency in transmitting data on the trunk.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described in relation to a multiport switch 180 transmitting data to a server 150 over a trunk. The present invention may also be used in situations where the multiport switch 180 transmits data over a trunk to another multiport switch 180 or to any other network device.

What is claimed is:

1. A network device configured to control communication of data frames between stations, comprising:
   a plurality of ports configured to receive data frames from the stations and to transmit the data frames, a number of the ports being configured as a trunk and at least one of the ports in the trunk being configured to transmit data frames at a higher speed than other ports in the trunk; and
   data frame processing logic configured to:
      identify data forwarding information for a received data frame, the data forwarding information identifying at least a first one of the ports,
      determine whether the first one of the ports is part of the trunk,
      determine a priority associated with the received data frame, and
      determine, when the first one of the ports is part of the trunk, a port in the trunk on which to transmit the data frame based on the priority associated with the received data frame.

2. The network device of claim 1, wherein when the priority associated with the received data frame is high, the data frame processing logic is configured to:
   identify the higher speed port as being the port on which to transmit the received data frame.

3. The network device of claim 1, wherein when the priority associated with the received data frame is at least one of normal or low, the data frame processing logic is configured to:
   identify a port in the trunk other than the higher speed port as being the port on which to transmit the received data frame.

4. The network device of claim 3, wherein when identifying a port in the trunk, the data frame processing logic is configured to:
   perform a trunk mapping function to identify the port, and
   select an other one of the ports in the trunk when the trunk mapping function identifies the higher speed port.

5. The network device of claim 1, wherein the data frame processing logic is further configured to:
   generate a forwarding descriptor for the received data frame, the forwarding descriptor identifying the port on which to transmit the received data frame, wherein when the priority of the received data frame is high, the forwarding descriptor identifies the higher speed port, and when the priority of the received data frame is normal or low, the forwarding descriptor identifies a port in the trunk other than the higher speed port.

6. The network device of claim 1, further comprising:
   a memory configured to store trunking information for each of the plurality of ports, the data frame processing logic being configured to determine whether the first one of the ports is part of the trunk based on the stored trunking information.

7. The network device of claim 6, wherein the memory includes:
   a plurality of registers corresponding to the plurality of ports, each of the registers including a trunk field for indicating whether the corresponding port is part of a trunk and a trunk active field for indicating whether the corresponding port is an active member of the trunk.

8. In a network device that controls the communication of data frames between stations, a method comprising:
   configuring a plurality of ports on the network device as a trunk, at least one of the ports in the trunk being configured to transmit data frames at a higher speed than other ports in the trunk;
   receiving a data frame on one of a plurality of ports of the network device;
   identifying data forwarding information for the received data frame, the data forwarding information identifying at least a first one of the ports on which to transmit the data frame;
   determining whether the first one of the ports is part of the trunk;
   determining a priority associated with the received data frame; and
   determining, when the first one of the ports is part of the trunk, a port in the trunk on which to transmit the data frame based on the priority associated with the received data frame.

9. The method of claim 8, wherein when the priority associated with the received data frame is high, the method further comprises:
   selecting the higher speed port as being the port on which to transmit the received data frame.

10. The method of claim 8, wherein when the priority associated with the received data frame is at least one of normal or low, the method further comprises:
    selecting a port in the trunk other than the higher speed port as being the port on which to transmit the received data frame.

11. The method of claim 10, wherein the selecting a port in the trunk includes:
performing a trunk mapping function to identify the port, and
selecting an other one of the ports in the trunk when the trunk mapping function identifies the higher speed port.

12. The method of claim 8, further comprising:
generating a forwarding descriptor for the received data frame, the forwarding descriptor identifying the port on which to transmit the received data frame, wherein when the priority of the received data frame is high, the forwarding descriptor identifies the higher speed port, and when the priority of the received data frame is normal or low, the forwarding descriptor identifies a port in the trunk other than the higher speed port.

13. The method of claim 8, wherein the configuring a plurality of ports on the network device as a trunk includes:
storing trunking information for each of the plurality of ports, and the determining whether the first one of the ports is part of the trunk includes:
reading the stored trunking information to determine whether the first one of the ports is part of the trunk.

14. The method of claim 13, wherein the storing trunking information includes:
setting trunk control bits in a memory, the trunk control bits indicating whether each of the ports is part of a trunk and whether each of the ports is an active member of the trunk.

15. A network device configured to control communication of data frames between stations, comprising:
a plurality of input ports configured to receive data frames from the stations;
a plurality of output ports configured to transmit the received data frames, a number of the output ports being configured as a trunk and at least one of the output ports in the trunk being configured to transmit data frames at a higher speed than other ones of the output ports in the trunk;
an address table configured to store address information and data forwarding information associated with the received data frames; and
decision making logic configured to:
identify data forwarding information for a received data frame from the address table, the data forwarding information identifying at least a first one of the output ports,
determine whether the first one of the output ports is part of the trunk, and
determine, when the first one of the output ports is part of the trunk, an output port in the trunk on which to transmit the received data frame.

16. The network device of claim 15, wherein the decision making logic is further configured to:
determine a priority associated with the received data frame, and the determining an output port in the trunk on which to transmit the received data frame includes:
identifying an output port based on the priority of the received data frame.

17. The network device of claim 16, wherein when identifying an output port based on the priority of the received data frame, the decision making logic is configured to:
identify the higher speed output port as being the output port on which to transmit the received data frame, when the priority of the received data frame is high.

18. The network device of claim 16, wherein when identifying an output port based on the priority of the received data frame, the decision making logic is configured to:
identify a port in the trunk other than the higher speed output port as being the output port on which to transmit the received data frame, when the priority associated with the received data frame is not high.

* * * * *